United States Patent [19]
Hatakeyama et al.

[11] Patent Number: 6,133,361
[45] Date of Patent: Oct. 17, 2000

[54] OXYGEN-ABSORBING COMPOSITION, OXYGEN-ABSORBING RESIN COMPOSITION, PACKING MATERIAL, MULTI-LAYERED PACKING, OXYGEN ABSORBER PACKET, PACKING METHOD AND PRESERVATION METHOD

[75] Inventors: Hidetoshi Hatakeyama; Haruaki Eto; Takashi Nakata; Hideyuki Takahashi, all of Katsushika-ku, Japan

[73] Assignee: Mitsubishi Gas Chemical Company, Inc., Tokyo, Japan

[21] Appl. No.: 09/042,237

[22] Filed: Mar. 13, 1998

Related U.S. Application Data

[63] Continuation-in-part of application No. 08/794,405, Feb. 3, 1997, Pat. No. 5,889,093.

[30] Foreign Application Priority Data

Feb. 3, 1996 [JP] Japan ...................................... 8-058292
Mar. 13, 1997 [JP] Japan ...................................... 9-059302

[51] Int. Cl.$^7$ ................................ C08K 3/16; C08K 3/12
[52] U.S. Cl. ........................ 524/447; 524/435; 524/439; 524/80; 252/188.28; 423/218; 426/232
[58] Field of Search ........................... 426/232; 423/219; 252/188.28; 524/80, 435, 439, 440

[56] References Cited

U.S. PATENT DOCUMENTS

| | | | |
|---|---|---|---|
| 4,127,503 | 11/1978 | Yoshikana et al. ................. | 252/188.28 |
| 4,166,807 | 9/1979 | Komatsu et al. ................... | 252/188.28 |
| 4,230,595 | 10/1980 | Yamaji et al. ..................... | 252/188.28 |
| 4,299,719 | 11/1981 | Aoki et al. ........................ | 252/188.28 |
| 4,942,048 | 7/1990 | Nasu et al. ............................... | 426/271 |
| 4,996,068 | 2/1991 | Hatakeyama et al. ............. | 252/188.28 |
| 5,034,252 | 7/1991 | Nilsson et al. ........................... | 524/538 |
| 5,085,878 | 2/1992 | Hatakeyama et al. ............. | 252/188.28 |
| 5,194,478 | 3/1993 | Frandsen et al. .................. | 252/188.28 |
| 5,241,149 | 8/1993 | Watanabe et al. ..................... | 428/35.2 |
| 5,262,375 | 11/1993 | McKedy ............................ | 252/188.28 |
| 5,262,378 | 11/1993 | McKedy et al. ................... | 252/188.28 |
| 5,274,024 | 12/1993 | Koyama et al. ......................... | 524/439 |
| 5,641,825 | 6/1997 | Bacskai et al. ......................... | 524/413 |
| 5,889,093 | 3/1999 | Hatakeyama et al. ............. | 252/188.28 |

FOREIGN PATENT DOCUMENTS

| | | | |
|---|---|---|---|
| 0 036 575 | 9/1981 | European Pat. Off. . | |
| 0 370 802 A1 | 5/1990 | European Pat. Off. . | |
| 55-149644 | 11/1980 | Japan ................. | 252/188.28 |
| 56-2845 | 1/1981 | Japan ................. | 252/188.28 |
| 60-20986 | 2/1985 | Japan ................. | 252/188.28 |
| 62-102829 | 5/1987 | Japan . | |
| WO 96/40412 | 12/1996 | WIPO . | |

OTHER PUBLICATIONS

European Search Report.

*Primary Examiner*—Peter A. Szekely
*Attorney, Agent, or Firm*—Fish & Richardson P.C.

[57] ABSTRACT

An oxygen-absorbing composition for a low-humidity environment includes a reduced metal and an accelerator having at least one of iodide and bromide. The accelerator may have at least one of a metallic iodide salt and a metallic bromide salt. The reduced metal and the accelerator may be included in a dry state and the oxygen-absorbing composition may take the form of particles. The oxygen-absorbing composition may be a resin composition made by kneading an oxygen absorber with a thermoplastic resin.

9 Claims, 1 Drawing Sheet

OXYGEN-ABSORBING COMPOSITION, OXYGEN-ABSORBING RESIN COMPOSITION, PACKING MATERIAL, MULTI-LAYERED PACKING, OXYGEN ABSORBER PACKET, PACKING METHOD AND PRESERVATION METHOD

This is a continuation-in-part of U.S. application Ser. No. 08/794,405, filed Feb. 3, 1997, now U.S. Pat. No. 5,889,293.

FIELD OF THE INVENTION

The present invention relates to an oxygen-absorbing composition for a low-humidity environment, including a reduced metal and an accelerator, and an oxygen-absorbing resin composition made by embedding an oxygen absorber in a thermoplastic resin. The present invention has an oxygen-absorbing capability under a low-humidity environment where the water content is no more than 1%. This invention also relates to a packing material composed of the resin composition, a package and a packing method for preserving a substance in a dried state with a low water content (mainly, dried food) by utilizing the above-mentioned packing material. Furthermore, the present invention relates to an oxygen absorber packet for a low-humidity environment formed by having an oxygen-absorbing composition wrapped in a gas-permeable wrapping material, and also relates to a preservation method utilizing such oxygen absorber packet.

BACKGROUND OF THE INVENTION

An oxygen absorber which utilizes an oxidation reaction of a reduced metal, such as metallic iron, has been widely known. Other than the reduced metal, this oxygen absorber comprises a metal halide as an accelerator for promoting the oxidation reaction of the reduced metal.

In order to mainly preserve the freshness of food, this type of oxygen absorber is placed together with a preserved substance, such as food, in a container or a packing material, or the oxygen absorber is contained within a container or a sheet material, which is then used to package a substance to be preserved.

The Japanese Patent (Kokoku) Publication No. SHO 56-33980 discloses an oxygen absorber of metal powder coated with a metal halide. Since a deoxidation reaction of a reduced metal requires the existence of water, this type of oxygen absorber is used to preserve a food containing a large amount of water (high water activity, $a_w$) which is capable of utilizing water transpired from the preserved substance. An oxygen absorber of that uses water vaporized from the preserved substance is known as a moisture-dependent oxygen absorber.

On the other hand, the Japanese Patent Kokoku Publication No. SHO 57-31449 discloses an oxygen absorber for preserving dried food having low water content (low water activity) wherein a water provider, such as an inorganic filler, impregnated with water is included in the oxygen absorbing composition and moisture necessary for an oxygen absorbing reaction is supplied therefrom. In order to preserve a substance having a low water content (i.e., having a low water activity $(a_w)$) such as dried food, a water-supplying component is included in an oxygen absorber in order to supplement water necessary for the oxygen-absorbing reaction. Since this type of oxygen absorber holds moisture in itself, it is known as a self-reacting oxygen absorber. A self-reacting type oxygen absorber is capable of absorbing oxygen without depending on water from the preserved substance.

The recent practice has been to package a preserved substance by using a sheet-shaped packing material which is made by kneading an oxygen absorber with a resin and forming the kneaded mixture into a sheet or film. However, if the self-reacting type of oxygen absorber which holds water is used to preserve a substance having a low water content, the transfer of water from the water-holding component to the preserved substance cannot be prevented. This results in problems in that the water spoils the taste of the preserved substance (due to humidity), changes the properties of the preserved substance (i.e., solidification of powder), causes a chemical change (or hydrolysis), or causes propagation of bacteria. In some cases, another problem is caused in that the oxygen absorber loses the water necessary for deoxidation and then becomes incapable of absorbing oxygen.

Furthermore, as the self-reacting type of oxygen absorber which holds water is heated when it is kneaded with a resin in order to be formed into a sheet, there is a problem in that not only water in the water-holding component evaporates, but also the evaporated water generates bubbles within the resin sheet, the surface of the resin sheet is made uneven and good surface properties of the sheet cannot be obtained.

On the other hand, when an oxygen absorber holding no water (water-dependent type) is kneaded with a resin to obtain a sheet material, it is necessary to perform the treatment for making the oxygen absorber hold water. However, if the resin sheet is made to hold water, this oxygen-absorbing resin sheet takes over the above-described defects of the self-reacting oxygen absorber.

Accordingly, the conventional oxygen-absorbing sheet is limited for the practical use to the type which itself contains no water and which is capable of absorbing oxygen by acquiring from a food having a high water content which contains moisture necessary for the oxygen-absorbing reaction. This oxygen-absorbing sheet is usually applied to a food containing a large amount of water.

Because of the reasons described above, those skilled in the art have had difficulties in realizing an oxygen-absorbing sheet capable of causing the deoxidation in a low-water environment. In other words, it has been difficult to preserve items having a low water content, such as a dried food, in good condition in a low oxygen environment by using the conventional oxygen absorber.

Accordingly, an object of the present invention is to provide an oxygen absorber and an oxygen-absorbing composition capable of sufficiently exhibiting the oxygen-absorbing function even in a low humidity environment with relative humidity of no more than 70% without any water being supplied, and which is capable of maintaining product quality when applied to items requiring a low-humidity environment for preservation. Another object of this invention is to provide an oxygen-absorbing resin composition having good thermoformability made by embedding an oxygen absorber in a thermoplastic resin. Furthermore, another object of the invention is to provide an oxygen absorber packet formed by wrapping such oxygen-absorbing composition and a preservation method utilizing such oxygen absorber packet.

A further object of this invention is to provide an oxygen-absorbing member and packing material in the form of a sheet or film, and a packing container, which are capable of exhibiting a sufficient oxygen-absorbing function in the low humidity atmosphere. Another object of this invention is to provide a package to preserve a substance having a low water content, which requires the low-humidity preservation condition, in the atmosphere of low oxygen concentration. A further object of this invention is to provide a method for preserving a substance having a low water content, which makes it possible to maintain the substance having a low water content in the atmosphere of low oxygen concentration by using the above-mentioned oxygen-absorbing composition.

SUMMARY OF THE INVENTION

In one embodiment, the present invention is characterized in that it is an oxygen absorber having a reduced metal that is preferably a metal powder and more preferably iron powder. Among metallic iodide salts and metallic bromide salts, alkaline metallic salts are preferable, and sodium salts and potassium salts are more preferable.

Having the aforementioned composition structure, the oxygen-absorbing composition or the oxygen absorber packet according to an embodiment of the present invention shows a sufficient oxygen-absorbing performance even when the relative humidity is 70% or less, especially when 60% or less, and since the water content of the oxygen-absorbing composition itself is less than 1% by weight, no moisture is transferred to dry items to which the oxygen absorber is applied. Therefore, by using the oxygen absorber according to this embodiment of the invention, it is possible to have oxygen absorbed and eliminated in respect to dry items under a low-humidity environment where relative humidity is 70% or less. Moreover, in respect to dry items having a water activity ($a_w$) of 0.7 or less, especially 0.6 or less, while oxygen may not be absorbed by applying conventional moisture-dependent oxygen absorbers unless water is supplied, the present invention is capable of implementing oxygen absorption for an item having a water activity of 0.7, or less without any water being supplied.

In other words, one embodiment of the present invention provides a preservation method characterized in that an oxygen-absorbing composition, an oxygen packet and a preserved item are placed in a gas-impermeable container.

In one embodiment of the invention, the oxygen permeability of a gas-impermeable container is preferably 0.05–100 cc/m$^2$, 24 hr, atm(25° C., 50% RH).

The method according to an embodiment of the invention may be preferably used for an item having a water activity of 0.2–0.7, especially 0.2–0.6.

According to one embodiment of the present invention, absorption of oxygen may be implemented under a low-humidity environment where relative humidity (RH) is 20–70%, especially 20–60%, whereby items disfavoring absorption of moisture and requiring a low-humidity, dry environment for preservation, for example, powdered, granular, or tablet type medical products, foods in a dry state (such as health food, snacks, dried food, fried food or seasonings), and other items to be preserved (such as raw materials of food, chemical materials, and electrical components) are preserved for a long period in an oxygen-free state with their qualities being favorably maintained.

In one embodiment, the present invention is characterized in that it is an oxygen-absorbing resin composition including an oxygen absorber containing a reduced metal and an accelerator containing a metallic salt of iodine or bromine as its principal component. The oxygen-absorbing composition may be a resin composition made by kneading or dispersing the oxygen absorber and the accelerator in a thermoplastic resin. By forming this resin composition, a packing material (or oxygen-absorbing member) with the water content of 1% or less in the shape of a sheet or film or in the mold form, the shape of which is not limited as a packing container, such as a tray, cup, tube or bag, can be obtained. This oxygen-absorbing member is obtained by being coated and packed with air-permeable materials which are permeable to oxygen. This embodiment of the invention is also characterized in that it is a multi-layered member which is made by providing a gas-permeation-resistant outside layer on one side of an intermediate layer, which is composed of the oxygen absorber composition, on the side facing the atmosphere, and by providing an air-permeable inside layer on the other side of the intermediate layer facing the packaged substance placed inside of the multi-layered member. The packing container is composed of this multi-layered member. As long as the packing container can achieve desirable effects, this multi-layered member may be used only for a part of the container. This multi-layered packing material is formed into, for example, a sheet or film. The invention is also characterized in that it is a method for preserving a substance having a low water content and low water activity in the low-humidity atmosphere in a hermetically sealed manner by using the above-mentioned packing material and packing container, and that it is a package which uses this oxygen-absorbing member to preserve the substance, which is in a dried state, by keeping the preserved substance in the atmosphere of low humidity and low oxygen concentration in a hermetically sealed manner. The invention is also characterized in that it is a method for preserving a substance having a low water content and low water activity in the low-humidity atmosphere by utilizing an oxygen-absorbing packet formed by wrapping an oxygen-absorbing composition in a gas-permeable wrapping material.

DESCRIPTION OF THE PREFERRED EMBODIMENTS

Figure 1:
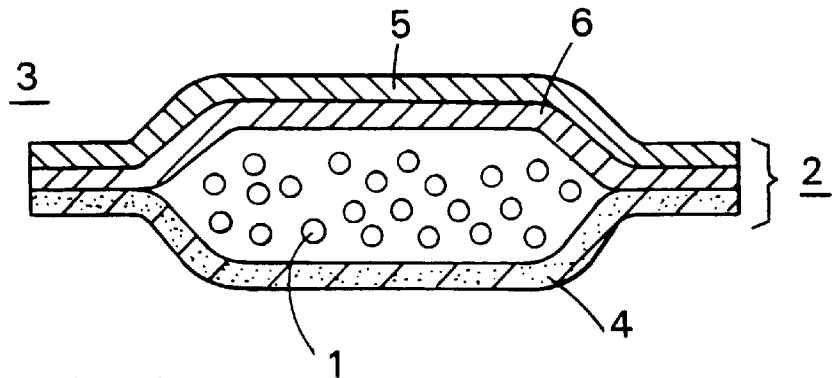
FIG. 1 is a sectional view of one embodiment of the multi-layered film of this invention.

Metallic iodide salt and metallic bromide salt, which had been thoroughly neglected as substances inferior to chlorides such as sodium chloride or calcium chloride, may function surprisingly as an accelerator of an oxygen-absorbing reaction under a low-humidity environment where relative humidity is no more than 70% without the existence of any water provider, and thereby enable oxygen-free preservation of items having low water activity, such as dried foods.

Although the above-mentioned Japanese Patent Kokoku Publication No. SHO 56-33980 refers to bromides and chlorides as options of oxygen-absorbing reaction accelerators, this Kokoku Publication does not disclose that oxygen absorbers which include oxygen-absorbing reaction accelerators made of metallic bromides and metallic chlorides are effective for preserving low water-activity items, such as dried food.

Furthermore, the Japanese Patent Kokoku Publication No. HEI 2-22701 discloses an oxygen absorber made of a basic halide and iron powder which does not require the use of any aqueous solution substance. However, this Kokoku Publication neither aims at providing halides capable of functioning as an oxygen absorber under a low-humidity environment nor suggests that oxygen absorbers including an oxygen-absorbing reaction accelerator made of a metallic bromide salt and a metallic chloride salt is effective for preserving low water activity items, such as dried food.

Namely, as means of solving the problems above, the present invention provides an oxygen-absorbing composition, an oxygen-absorbing resin composition, an oxygen absorber packet or a packing material having an oxygen-absorbing function under a low-humidity environment which includes a reduced metal and at least one of a metallic iodide salt or a metallic bromide salt in a dry state with their water content preferably being no more than 1% by weight.

Embodiments of the present invention are hereinafter explained in more detail. As known components, as well as contents and a manufacturing method thereof, of the composition of this invention, known prior art can be used as reference. For example, the aforementioned Japanese Patent (Kokoku) Publication No. SHO 56-33980, for which an application was filed by the applicant of this invention, can be referred to.

Known reduced metals can be used as an oxygen-absorbing component or a deoxidizing component. It is preferable to use metal iron. Specific examples are: granular or particulate-type metal powder such as iron powder, copper powder or zinc powder, among which iron powder is preferable. These metals are used solely or in combination. In order to have the particulate-type metal powder favorably contact the oxygen, it is desirable that the particulate-type metal powder normally have particles with a diameter of no more than 1700 $\mu$m (10 meshes), especially 10–300 $\mu$m (50 meshes). As a metal powder, it is desirable to use iron powder, and reduced iron powder, electrolyzed iron powder, atomized iron powder, etc. are preferably used. Milled, pulverized or ground form of cast iron, etc. are also used.

As a metallic iodide salt or a metallic bromide salt to be oxygen-absorbing reaction accelerator of the oxygen-absorbing composition, preferably used are electrolytic salts of metals such as alkaline metals, alkaline earth metals, copper, zinc, aluminum, tin, iron, cobalt, nickel, etc. A combination of a plurality of different metallic salts may also be used. Sodium iodide salts and potassium iodide are examples of the metallic iodide salts, and sodium bromide and potassium bromide are examples of metallic bromide salts. However, it is desirable that heavy metallic salts are avoided. Among the aforementioned metallic salts, sodium iodide and potassium iodide, sodium bromide and potassium bromide are desirable, where sodium iodide and potassium iodide are more desirable. Iodide is preferred because it is superior in the oxygen-absorbing property in low humidity. On the other hand, bromide is preferred from the viewpoint of safety against foods.

The reaction accelerator (or activator) contains iodide or bromide as its principal component. The expression "principal" is used in a relative sense. Namely, it means that the existence of other substances such as halide is permissible within the extent that the composition will not be hindered from causing the oxygen-absorbing reaction even in a low-water environment. In a preferred embodiment, the content of the iodide or bromide in the reaction accelerator is 90 wt % or more, preferably 95 wt % or more. The oxygen-absorbing composition is more effective as compared with conventional oxygen absorbers when used under a condition with a relative humidity of 20–70%, especially 20–60%, notably 30–60%. If metallic bromide salt is used as an oxygen-absorbing reaction accelerator, it is more effective than conventional oxygen-absorbing reaction accelerators within the aforementioned ranges but especially favorable within a range of 50–70%.

The method of blending a metal powder and a metallic iodide salt or a metallic bromide salt is not necessarily limited. For example, the metallic iodide salt or the metallic bromide salt can be made into an aqueous solution and be blended with the metal powder. It is especially preferable to use a method of blending an aqueous solution of a metallic iodide salt or a metallic bromide salt with iron powder because adhesion of the metal powder and the metallic iodide salt or the metallic bromide salt is thereby promoted. In such cases, the blending amount of the metallic iodide salt or the metallic bromide salt may be reduced. Upon blending the metal powder with the metallic iodide salt or the metallic bromide salt, it is desirable that contact with air be kept at a minimum.

In addition to the above-described metal powder, metallic iodide salt or metallic bromide salt, additive agents can be added to the oxygen-absorbing composition according to an embodiment of the present invention if necessary. For example, siliceous powder, pearlite, diatomaceous earth, aluminum hydroxide, alumina, activated carbon, water-absorbing polymer, etc. may be suitably blended for preventing malodor, restraining dust, preventing blots of rust. It is preferable that the oxygen-absorbing composition created by adding the additive agent have a water content of no more than 1% by weight, more preferably no more than 0.5% by weight.

The more the water content of the oxygen-absorbing composition, the more moisture will be transferred from the oxygen-absorbing composition and the less the fluidity of the oxygen-absorbing composition will be. Therefore, it is preferable that the water content of the oxygen-absorbing composition be no more than 1% by weight. The ratio of the water content to the entire weight is to be no more than 1% by weight, and more preferably no more than 0.5% by weight. Although there is no limitation to the method of controlling the water content, it is preferable to add heat, reduce pressure, utilize drying agents or implement desiccation operation processing combining the foregoing.

As described above, the oxygen-absorbing composition according to one embodiment of the invention is composed of a reduced metal, which is to be the main agent, and a mixture including either a metallic iodide salt or a metallic bromide salt which is to be the oxygen-absorbing reaction accelerator, and thereby constitutes a powder and particulate-type oxygen-absorbing composition which substantially does not include water. The oxygen-absorbing composition according to one embodiment of the invention is normally packed and wrapped in a small bag made of a gas-permeable wrapping material and used as an oxygen absorber packet. Porous or oxygen-permeating plastics, non-woven fabrics, paper, film, sheets or moldings composed of laminates of the foregoing may be used as gas-permeable wrapping materials. Examples of materials for plastics are polyester, polyamide, polycarbonate and polyolefine. On surfaces where the wrapping materials are adhered to each other, desirably placed are materials such as polyethylene or polypropylene etc. which can be heat sealed. Moreover, it is also possible to use as an oxygen absorber packet according to an embodiment of the present invention, which is a packet formed by having an oxygen-absorbing composition according to an embodiment of the present invention sandwiched between or blended into non-woven fabrics, papers and other gas-permeable wrapping materials. The gas-permeable wrapping materials are for fixation and can be made into an easily-handled sheet-shaped oxygen absorber. The oxygen absorber is wrapped with the aforementioned gas-permeable wrapping materials.

The oxygen-absorbing composition package is more effective than the conventional oxygen absorber packet when used under a condition with a relative humidity of 20–70%, especially 30–70%, notably 30–60%. If a metallic bromide salt is used as an oxygen-absorbing reaction accelerator, the oxygen absorber packet is more effective than conventional oxygen absorbers within the aforementioned ranges, but is especially effective within a range of 50–70%.

The oxygen-absorbing composition package according to one embodiment of the present invention demonstrates more effectiveness than conventional oxygen absorber packets upon preservation of relatively dry items having a water activity of 0.2–0.7, especially 0.3–0.7. If a metallic bromide salt is used as an oxygen-absorbing reaction accelerator, the oxygen absorber packet according to an embodiment of the present invention is more effective than the conventional oxygen absorbers within the aforementioned ranges, but is especially favorable for items having a water activity range of 0.5–0.7.

According to one embodiment of the present invention, oxygen absorption can be conducted under a relatively dry condition in respect to relatively dry items, without any moisture being supplied and without causing any transfer of moisture.

By using the oxygen-absorbing composition and the oxygen absorber packet according to an embodiment of the present invention, items can be preserved in an oxygen-free state. In such cases, a gas-impermeable container (may be hereinafter simply referred to as a "container") is to be used. There is no limitation to the shape of the material of the container if such container can be sealed and comprises a gas-impermeable performance. Some examples of such a container are: metal cans, glass jars, plastic containers, bags, etc. Furthermore, molded containers and bags composed of multilayered sheets or film having oxygen permeability of 0.05–100 cc/m$^2$, 24 hr, atm(25° C., 50% RH) can be preferably used. The multilayered sheets or film may be, for example, laminates of polyethylene terephthaleta/vapor-deposited aluminum/polyethylene laminates of oriented polypropylene/polyvinylalcohol/polyethylene laminates of polyvinylidene chloride coated (K coat) oriented nylon/polyethylene etc. or nylon coextruded laminates.

Even when used under a low-humidity environment for the oxygen absorption of low-moisture content food, the oxygen absorber according to an embodiment of the present invention shows the following oxygen-absorbing performance:

By using 2 g of the oxygen absorber according to an embodiment of the present invention which includes at least one of a metallic iodide salt or a metallic bromide salt, complete oxygen absorption is implemented in one day at a temperature of 25° C. in respect to 500 ml of relatively dry air having a relative humidity of 70–50%, the oxygen absorption of which had been difficult by the conventional oxygen absorbers comprising metallic chloride salts. By using 2 g of the oxygen absorber according to an embodiment of the present invention which includes a metallic iodide salt, complete oxygen absorption is implemented in one day at a temperature of 25° C. in respect to 500 ml of dry air having a relative humidity of 30%. The oxygen absorber according to an embodiment of the present invention can be used for oxygen-free preservation of foods such as powder food, powder soup, cookies, etc. or relatively dry items.

EXAMPLE 1

Referring to FIG. 1, a potassium iodine solution (2 g of potassium iodide) was added to 100 g of iron powder (average particle diameter: 50 μm) by mixing the solution with the iron powder, and desiccation was implemented under a reduced pressure of 40 mmHg at a temperature of 40° C. Whereby produced was a particulate-type oxygen absorbing composition. 2 g of the obtained oxygen composition was packed and wrapped in a small gas-permeable bag 2, the surface of which being made of polyester 5/polyethylene 6 and the backside of which being made of a polyethylene non-woven fabric 4, and was thereby formed into an oxygen absorber packet 3. The water content of the oxygen absorbing composition was no more than 0.1% by weight when measured by Karl Fischer's Method. Subsequently, the oxygen absorber packet was put into gas-impermeable bags made of laminated film of K coat nylon/polyethylene together with a piece of cotton, each impregnated with 10 ml of 4 different types of glycerin solution shown below for adjusting humidity inside the bags to predetermined humidity. After filling 500 ml of air, the bags were heat sealed. The bags holding the oxygen absorber packet and the cotton impregnated with glycerin solution were kept at 25° C., and the oxygen concentration inside the bag was measured each day by a zirconic oxygen analyzer (made by Toray Engineering Co., Ltd.) so that the deoxidation inside the bag may be followed. The results are shown in Table 1. The relation between the concentration of glycerin solutions being used and the relative humidity (RH) inside of the bags were as follows:

(1) glycerin solution 34 parts by weight: RM 90%;
(2) glycerin solution 63 parts by weight: RH 70%;
(3) glycerin solution 79 parts by weight: RM 50%; and
(4) glycerin solution 92 parts by weight: RH 30%.

TABLE 1

| | | Oxygen concentration by volume in the bag | | | |
|---|---|---|---|---|---|
| | Metal Halide Type | After 1 Day; RH 90% | After 1 Day: RH 70% | After 2 Days: RH 50% | After 2 Days: RH 30% |
| Example 1 | potassium iodide | no more than 0.1% | no more than 0.1% | no more than 0.1% | no more than 0.1% |
| Example 2 | sodium iodide | no more than 0.1% | no more than 0.1% | no more than 0.1% | no more than 0.1% |
| Example 3 | potassium bromide | no more than 0.1% | no more than 0.1% | no more than 0.1% | 17.0% |
| Example 4 | sodium bromide | no more than 0.1% | no more than 0.1% | no more than 0.1% | 17.3% |
| Comparison 1 | potassium chloride | no more than 0.1% | 9.0% | 16.9% | 20.1% |
| Comparison 2 | sodium chloride | no more than 0.1% | 10.0% | 17.1% | 20.1% |
| Comparison 3 | calcium chloride | no more than 0.1% | 7.0% | 14.1% | 18.0% |

EXAMPLES 2–4

The same procedures were performed as in example 1 except for using sodium iodide in example 2, potassium bromide in example 3 and sodium bromide in example 4 instead of potassium iodide in example 1. The water content of all oxygen absorbing compositions produced was no more than 0.1% by weight. The results are shown in Table 1.

COMPARISONS 1–3

The same procedures were performed as in example 1 except for using potassium chloride in comparison 1, sodium chloride in comparison 2 and calcium chloride in comparison 3 instead of potassium iodide in example 1. The water content of all oxygen absorbing compositions produced was no more than 0.1% by weight. The results are shown in Table 1.

EXAMPLE 5

An oxygen absorber packet formed by having 0.5 g of the oxygen absorbing composition produced in example 1 packed and wrapped in a small gas-permeable bag made of laminates of porous polyester/porous polyethylene/oil-proof paper/porous polyethylene was put into a gas-impermeable bag made of combined film (polyethylene terephtalete/aluminum foil/polyethylene) together with 50 g of commercial granular-type soup stock (water activity: 0.35). The bag was further filled with 30 ml of air and thereafter sealed. After preserving the sealed bag for 1 month at 25° C., the oxygen concentration inside the bag was measured as no more than 0.1%. The granular-type soup stock maintained a favorable flavor, and no solidification of the granules was observed.

COMPARISON 4

The same procedure was performed as in example 5 except for using an oxygen absorber packet formed by having 0.5 g of the oxygen absorbing composition produced in comparison 2 packed and wrapper in a gas-permeable bag and heat sealed. After preserving the sealed bag holding the oxygen absorber packet and granulate-type soup stock for 1 month at 25° C., the oxygen concentration inside the bag was 19.7%. Although no solidification of the granular-type soup stock was acknowledged, its flavor had deteriorated.

COMPARISON 5

The same procedure was performed as in example 5 except for using a commercial self-reacting oxygen absorber (produce name: "Ageless Z-20PT"; manufactured by MITSUBISHI GAS CHEMICAL CO., INC.), which is an oxygen absorber packet formed by having an iron oxygen absorbing composition impregnated with water packed and wrapped in a gas-permeable bag. After preserving the sealed bag holding the oxygen absorber packet and granular-type soup stock for 1 month at 25° C., the oxygen concentration inside the bag was no more than 0.1%. Although the granular-type soup stock maintained a favorable flavor, aggregation and solidification of the granules were observed.

EXAMPLE 6

Sodium bromide solution (1 g of sodium bromide) was added to 100 g of iron powder (average particle diameter: 90 $\mu$m) by mixing the solution with the iron powder, and desiccation was implemented by hot air, whereby produced was a particulate-type oxygen absorbing composition no more than 0.1% by weight when measured by Karl Fischer's Method. Subsequently, an oxygen absorber packet formed by having 0.5 g of the obtained oxygen composition packed and wrapped in a small gas-permeable bag, the surface of which being made of polyester/polyethylene and the backside of which being made of a polyethylene nonwoven fabric, was put into a gas-impermeable bag made of combined film (K coat nylon/polyethylene) together with 50 g of cookies (water activity: 0.7). The bag was further filled with 30 ml of air and thereafter sealed. After preserving the sealed bag for 1 month at 25° C., the oxygen concentration inside the bag measured was no more than 0.1%. The cookies maintained a favorable flavor and color, and no dampness was noticed.

COMPARISON 6

The same procedure was performed as in example 6 except for using sodium chloride instead of sodium bromide in example 6. After preserving the sealed bag enclosing the oxygen absorber packet and the cookies for 1 month at 25° C., the oxygen concentration inside the bag was 15.0%. The flavor and the color of the cookies inside deteriorated.

COMPARISON 7

The same procedure was performed as in example 6 except for using a commercial self-reacting oxygen absorber (product name: "Ageless Z-20Pt": manufactured by MITSUBISHI GAS CHEMICAL CO., INC.) which is an oxygen absorber having an iron oxygen absorbing composition impregnated with water packed and wrapped in a small gas-permeable bag. After preserving the sealed bag holding the oxygen absorber packet and the cookie for 1 month at 25° C., the oxygen concentration inside the bag was measured as no more than 0.1%. Although the cookie inside maintained favorable flavor and color, dampness was noticed in the cookies.

The present invention is characterized in that it provides an oxygen absorbing composition and an oxygen absorber packet having effective performance unachieved by conventional reduced-metal oxygen absorbers, i.e., to implement oxygen absorption without carrying in moisture like self-reacting oxygen absorbers, and furthermore, implement oxygen absorption under a low-humidity environment where conventional moisture-dependent oxygen absorbers could not be applied.

According to the present invention, provided are an oxygen absorbing composition and an oxygen absorber packet capable of achieving sufficient oxygen absorbing reactions. Consequently, by using the preservation method utilizing the oxygen absorber according to the present invention, items having low water activity, especially medical products and food etc. in dry condition can be kept under an oxygen-free environment without causing any moisture absorption, and the items can be preserved for a long period without their quality being deteriorated or their nature being changed.

In one embodiment, the oxygen-absorbing composition is a resin composition made by embedding or dispersing an oxygen absorber in a thermoplastic resin. Known reduced metals can be used as oxygen-absorbing component or deoxidizing component as described above. The reaction accelerator of this embodiment of the present invention may be mixed with the reduced metal powder, but it is desirable to coat the reaction accelerator over the metal powder. The content of the reaction accelerator in the oxygen absorber may be within a known range. For example, the coating amount of the reaction accelerator is 0.1–20 parts by weight of the iodide or bromide against 100 parts by weight of the reduced metal. If the reaction accelerating component is attached to the surface of the metal and if the metal and iodide or other metallic salt do not separate from each other when the oxygen absorber is mixed with the resin so that the accelerator reaction can be fully expected, the content of iodide or other metallic salt may be 0.1–10 parts by weight, more preferably 0.5–6 parts by weight.

The thermoplastic resin in which the oxygen absorber is mixed is not specifically limited as long as it is permeable to oxygen. A preferred oxygen permeation coefficient is 200 cc·0.1 mm/m$^2$·atm·day (23° C., RH100%) or more. Particularly, polyethylene, polypropylene, various kinds of ethylene copolymer, modified polyolefine, elastomer or the like may be used solely or in combination. An appropriate thermoplastic resin is selected from the above-listed substances by taking into consideration the adhesiveness between the gas-permeation-resistant outside layer and the inside layer as described below.

The oxygen-absorbing resin composition of this embodiment of the invention is designed to be suitable for the preservation of a substance having a low water content. Accordingly, when the resin composition is formed into, for example, a sheet, the sheet itself contains substantially no water-holding component. The sheet preferably has good thermoformability without causing any inconvenience such as generation of bubbles at the time of thermoforming processing, has the water content of 1 wt % or less preferably 0.2 wt %, and is capable of sufficiently causing the oxygen-absorbing reaction in the above-described condition.

As heat is applied to form the oxygen absorber of this embodiment of the invention mixed in the thermoplastic resin into, for example, a sheet (by heating the resin at a temperature no lower than the melting temperature of the resin), the above-described maximum value of the water content is usually attained.

When the thermoplastic resin and the oxygen absorber are kneaded, the water content of the oxygen absorber is 1 wt %, for example, 0.1 wt % or less, against the thermoplastic resin and the oxygen absorber. More water does not necessarily have to be retained in order to have the oxygen absorber exhibit its oxygen-absorbing performance. This makes it possible to avoid the remaining water in the sheet or the occurrence of inconvenient changes, i.e., generation of bubbles, on the surface of the sheet when the resin sheet is made from the resin composition.

In order to remove the water contained in the oxygen absorber, the oxygen absorber may contain alkaline earth metals, water absorber (such as diatomaceous earth, pulp or water-absorbing polymer), odor absorbant (such as activated carbon, molecular sieve), or coloring pigment (such as titanium oxide, iron oxide or carbon black). The resin layer containing the oxygen absorber may be drawn and perforated after the dispersion of the oxygen absorber in the resin in order to enhance the air permeability.

The gas-permeation-resistant outside layer is determined to be appropriate according to the manufacturing method, purpose of use, etc. of the packing material to be made. Namely, for a sheet manufactured by coextrusion or a molded form thereof (such as a tray, cup or bottle), it is preferable to use ethylene-vinyl alcohol copolymer or nylon MXD6 (made by MITSUBISHI GAS CHEMICAL CO., INC.) as a coextrusion material for producing the outside layer. In order to form a film by pasting (or laminating) processing, it is desirable to use, other than the above-described resin film, polyvinylidene chloride for coating, or a film of polyester or nylon with metallic oxide (such as aluminum oxide or silicon oxide) evaporated thereon, or a metal foil or metal sheet of aluminum or the like. Particularly, since the preserved substance contains a small amount of water, it is necessary to avoid steam permeation as much as possible. Therefore, a metal sheet or metal foil may be selected.

Besides the resin which composes the intermediate layer containing the oxygen absorber, as the inside layer, polymethylpentene, polystyrene, ethylene-vinyl acetate copolymer, and a mixture thereof can be used. Namely, a polyolefine group such as polyethylene, polypropylene, various kinds of ethylene-α olefin copolymer, ethylene acid copolymer, ionomer, polybutene or polymethylpentene can be used solely or by blending a plurality of the above-listed substances. It is also possible to use a sealant resin which is easily peelable and which is available on the market. The above-listed resins may be used either as they are extruded from a pellet or as the resins respectively formed into a film are pasted together.

It is possible to use a type of the sealant film which is available on the market and which has a multi-layered construction in order to become easily peelable. Moreover, it is possible to add a coloring pigment or filler to the resin of the inside layer to the extent not to diminish the expected properties of this layer.

In order to prevent oxygen from reaching the intermediate layer from the space where the preserved substance is located, the inside layer is designed to be capable of being adhered to the intermediate layer without any adhesive layer provided. An appropriate material for the inside layer is selected, which can exhibit proper heat sealability at the time of the manufacture of a bag or the sealing.

The film thickness of the inside layer is selected as appropriate according to a total thickness of the final form such as a container or a film. In the case of a container, an example construction would be: the inside layer 30–100 μm thick; the intermediate layer 50–200 μm thick; the gas-permeation-resistant layer 10–50 μm thick; and in addition, a polyolefine layer 100–1,000 μm thick to retain strength. In the case of a film, an example construction would be: the inside layer 15–30 μm thick; the intermediate layer 30–100 μm thick; and the gas-permeation-resistant layer 5–50 μm thick.

Examples of the form of the packing material or package of this embodiment of the invention are as follows: The multi-layered film consisting of the inside layer, the intermediate layer and the outside layer is heat-sealed to form a bag, and a substance to be preserved is then placed in this bag. If a heavy-duty packing is desired, the package may be wrapped with kraft paper, corrugated fiberboard, a fiber drum or a metal can. Moreover, the multi-layered sheet consisting of the above-described layers made from materials thicker than films and having high rigidity is formed into a multi-layered container (such as a tray, cup or bottle), in which the substance to be preserved is placed and which is then covered and hermetically sealed with a gas-permeation-resistant lid.

According to this embodiment of the present invention, the preserved substance having a low water content means any substance which has a low water content and has a small amount of water to diffuse, and to which a conventional self-reacting-type oxygen absorber cannot be applied. A preferred water activity ($a_w$) of such substance is 0.2–0.7, more preferably 0.2–0.5. In other words, this embodiment of the invention can be preferably applied to the substance having a low water activity, which needs to be preserved in a low-humidity, dry condition. In order to preserve the substance having the low water content, which requires a low-humidity preservation condition, a preferred relative humidity (RH) of the atmosphere where the substance having the low water content is preserved is 20–70%, more preferably 20–50%. A preferred water content of the lowwater-content substance is 50 wt % or less, more preferably 10 wt % or less. However, as particular examples of this low-water-content substance (or packaged substance) which can fully utilize this invention, foods or medicines which react adversely to any increase of water and for which it is necessary to prevent any foreign matter from being mixed in may be listed, for example: powdery or granular foods (granular soup stock, beverage powder, confectionery powder, seasonings, cereal powder, nutritious food, health food, coloring agent, aromatic agent, or spices), powdery or granular medicines (powdered medicines, soap powder, tooth powder or industrial medicines), or any molded form (such as tablets) of the above-listed substances.

Examples of the packing material of this invention are as follows: Abbreviations herein used respectively stand for the following substances:

PET: polyethylene terephthalate

PE: polyethylene

OA: oxygen absorber

LLDPE straight chain (or linear), low density polyethylene

EVOH: ethylene-vinyl alcohol copolymer

PP: polypropylene

Examples of the Packing Material

Light Packing Paper:

paper (or PET)/aluminum/PE/PE+OA/PE (LLDPE)

Heavy-Duty Packing Paper:

paper (two or three layers)/PP/aluminum/PE/PE+OA/PE (LLDPE)

Heavy-Duty Packing Box:

box (corrugated fiberboard)+(PE/PE/EVOH/PE/PE/PE+OA/PE)

Container:

container (PP/EVOH/PP)+lid (PET/aluminum/PE/PE+OA/PE)

Container:

container (PP/EVOH/P+OA/PP)+lid (PET/aluminum/PP)

Container:

container (aluminum/PP+OA/PP)+lid (PET/aluminum/PP)

EXAMPLE 7

By using a closed ribbon blender with a heating jacket, 5 kg of potassium iodide was added to and mixed with 200 kg of reduced iron powder (average grain diameter: 30 $\mu$m; metal iron content; 95% or more) in a solution. Subsequently, the jacket was charged with steam and the inside of the mixer was degassed by a vacuum pump and was dried to coat the surface of the metal iron with potassium iodide, thereby obtaining an oxygen-absorbing composition.

Then the oxygen-absorbing composition, polyethylene, white pigment and calcium oxide were kneaded at the weight ratio of 50:45:0.5:0.1 and were extruded by using a biaxial extruder, and the extruded material was cooled and crushed into a resin composition.

Figure 2:
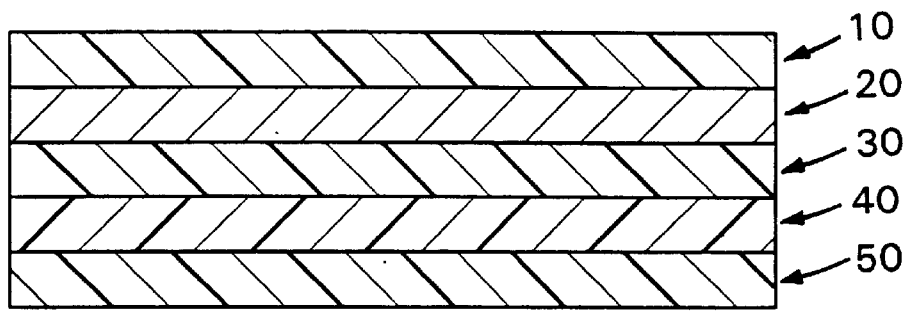
FIG. 2 is a model view of the condition where a substance to be preserved is enclosed in the multi-layered film shown in FIG. 1.

The resin composition and polyethylene containing a white pigment at the percentage of 10% were laminated over a polyethylene film in the order listed above, by using a tandem laminator. Subsequently, polyethylene terphthalate (PET) and an aluminum foil were laminated over the polyethylene film side by means of extrusion laminating, thereby obtaining a multi-layered film composed of: PET layer 10 (12 $\mu$m); aluminum foil layer 20 (outside layer; 9 $\mu$m); polyethylene layer 30 (20 $\mu$m); oxygen-absorbing resin layer 40 (intermediate layer; 20 $\mu$m); and polyethylene 50 (inside layer: 25 $\mu$m), as shown in FIG. 2. In the oxygen-absorbing resin, iron grains with potassium iodide coated on the surface thereof were dispersed.

This film was formed into a bag (130 mm×140 mm) with its four sides sealed. This bag is hereinafter called the "packing bag of this invention." Another bag (130 mm×140 mm) with its four sides sealed was also made in the same manner as described above, except that sodium chloride was used, instead of potassium iodide, in the same amount as that of potassium iodide. This bag is hereinafter called the "comparative packing bag 1." A still another bag (130 mm×140 mm) with its four sides sealed was made in the same manner as described above, except that calcium chloride was used, instead of potassium iodide, in the same amount as that of potassium iodide. This bag is hereinafter called the "comparative packing bag 2." On the other hand, another bag was made in the same manner as described above by using a lamination film of PET, aluminum foil and polyethylene, which is available on the market. This bag is hereinafter called the "gas-permeation-resistant bag."

The water content of the resin composition, which was measured by the Karl Fischer method, was 500 ppm or less. The water content of the packing bag of this invention, the comparative packing bag 1, the comparative packing bag 2 and the gas-permeation-resistant bag was respectively measured in the same manner, and the resulted water content was within the range of 2,000 ppm through 3,000 ppm.

Measurement of Oxygen-Absorbing Capacity of Respective Bags 20 g of diatomaceous earth which was impregnated with 10 cc of a humidity conditioning solution of water and glycerol mixed at the ratio mentioned below was put in each bag, 40 cc of air was inserted into each bag, the mouth of which was then heat-sealed. These bags were preserved at temperatures of 25° C. or lower and the oxygen concentration within the bags after the passage of time for several days was analyzed by using gas chromatography. Table 2 shows the results of the analysis.

(Mixing Ratio of the Humidity Conditioning Solution of Water and Glycerol)

RH100%: 100 parts by weight of water against 0 part by weight of glycerol

RH50%: 21 parts by weight of water against 79 parts by weight of glycerol

RH30%: 8 parts by weight of water against 92 parts by weight of glycerol.

TABLE 2

|  | Elapsed Days | Packing Bag of This Invention | Comparative Packing Bag 1 | Comparative Packing Bag 2 | Gas-Permeation-Resistant Bag |
|---|---|---|---|---|---|
| RH 100% | 5 days | 0.1% or less | 0.1% or less | 0.1% or less | 20.5% |
| RH 50% | 10 days | 0.1% or less | 16.1% | 15.3% | 20.5% |
| RH 30% | 15 days | 0.1% or less | 19.5% | 19.3% | 20.4% |

The comparative packing bags which used sodium chloride and calcium chloride as the accelerator showed a high oxygen-absorbing speed at high water and high humidity. However, it was confirmed that at low water and low humidity, the packing bag of this invention showed remarkably superior oxygen-absorbing capacity.

Preservation Test

Figure 3:
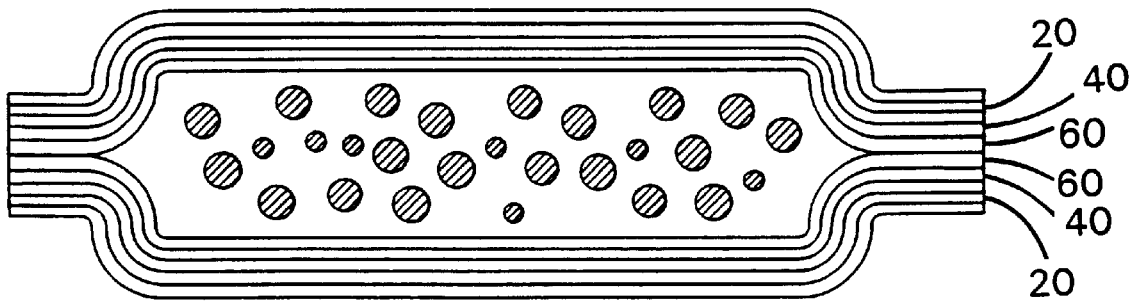
FIG. 3 is a cross-sectional view showing an embodiment of the oxygen absorber.

Powdered green tea, fish flour, granular soup stock, pancake mix, ascorbic acid powder, and silicon nitride, each in the amount of 50 g, were respectively filled in the above-described bags together with 30 cc of air, and the bags were hermetically sealed by means of heat sealing and were preserved at ordinary temperatures. FIG. 3 shows a model view of the packing bag of this invention in which the above-described contents are placed in a hermetically sealed manner. The conventional gas-permeation-resistant bag was packaged by three kinds of methods of: (a) containing only the above-mentioned contents: (b) containing a water-dependent oxygen absorber (AGELESS FX-20 made by MITSUBISHI GAS CHEMICAL CO., INC.) together with the above-mentioned contents; and (c) containing a self-reacting oxygen absorber (AGELESS Z-20PT made by MITSUBISHI GAS CHEMICAL CO., INC.) together with the above-mentioned contents. After the preservation for one month, the oxygen concentration within the bags were analyzed by means of gas chromatography, the packing bags were then opened and the contents were evaluated. Table 3 shows the results of the evaluation.

The contents of the respective bags were dried food or powder which contain a small amount of water with the water content and $a^v$ as described below. The water content was measured by the loss on drying method at a temperature of 105° C. for 2 hours and $a^v$ was measured by an $a^v$ meter made by SHIBAURA DENKI.

Silicon nitride:
    water content of 10% or less and $a^v=0.4$

As shown Table 3, the packing bag of this invention exhibited a good absorbing capacity against the oxygen within the bag for each oft he contents. As for the comparative packing bags 1 and 2, since the oxygen absorber contained no substance to supply water, the oxygen absorber could not catalyze the oxygen-absorbing reaction in the low-water environment and, as a result, the oxygen absorption was not sufficiently conducted. As for the gas-permeation resistant bag (a), since it did not contain any oxygen absorber, as a matter of course it could not remove the oxygen within the bag. Since the oxygen absorber of the gas-permeation-resistant bag (b) was the dependent reaction type which causes the oxygen-absorbing reaction by using water moved in from outside, it could not preferably attain the oxygen-absorbing reaction in the environment where the preserved dried substance from which such water could not be expected was enclosed. Accordingly, in the bags other than the packing bag of this invention, the flavor of the contents was spoiled and deterioration due to oxygen such as discoloration of the contents occurred.

TABLE 3

| | Packing Bag of This Invention | Comparative Packing Bag 1 | Comparative Packing Bag 2 | Gas-Permeation-Resistant Bag (a) | Gas-Permeation-Resistant Bag (b) | Gas-Permeation-Resistant Bag (c) |
|---|---|---|---|---|---|---|
| Powdered Green Tea $a^v = 0.4$ | 0.1% or less Good flavor and no discoloration | 18.8% Flavor spoiled and discoloration caused | 18.5% Flavor spoiled and discoloration caused | 20.0% Flavor spoiled and discoloration caused | 18.7% Flavor spoiled and discoloration caused | 0.1% or less Slightly good flavor and no discoloration |
| Fish Flour $a^v = 0.25$ | 0.1% or less Good flavor and no discoloration | 19.5% Flavor spoiled and discoloration caused | 18.9% Flavor spoiled and discoloration caused | 19.8% Flavor spoiled and discoloration caused | 19.2% Flavor spoiled and discoloration caused | 0.1% or less Flavor spoiled and no discoloration |
| Granular Soup Stock $a^v = 0.35$ | 0.1% or less Good flavor and no solidification | 19.0% Flavor spoiled and no solidification | 19.1% Flavor spoiled and no solidification | 20.0% Flavor spoiled and no solidification | 18.5% Flavor spoiled and no solidification | 0.1% or less Good flavor and solidification caused |
| Pancake Mix $a^v = 0.5$ | 0.1% or less Good flavor | 14.4% Flavor spoiled | 13.0% Flavor spoiled | 20.0% Flavor spoiled | 19.1% Flavor spoiled | 0.1% or less Flavor spoiled |
| Ascorbic Acid Powder $a^v = 0.4$ | 0.1% or less No discoloration | 16.6% No discoloration | 17.0% Discoloration caused | 18.8% Discoloration caused | 18.8% Discoloration caused | 0.1% or less Discoloration |
| Silicon Nitride $a^v = 0.4$ | 0.1% or less No abnormality | 17.9% Strength lowered after sintering | 17.1% Strength lowered after sintering | 20.2% Strength lowered after sintering | 19.9% Strength lowered after sintering | 0.1% or less Moldability at the time of sintering lowered |

Powdered green tea:
    water content of 10% or less and $a^v=0.4$
Fish flour:
    water content of 10% or less and $a^v=0.25$
Granular soup stock:
    water content of 10% or less and $a^v=0.35$
Pancake mix:
    water content of 10% or less and $a^v=0.5$
Ascorbic acid powder:
    water content of 10% or less and $a^v=0.4$ On the other hand, in the gas-permeation-resistant bag (c) including the self-reacting-type oxygen absorber which itself contains the water-holding component, water from the water-holding component moved to the food, causing the powder to be solidified. In the case of silicon nitride, which is a ceramic material, while the packing bag of this invention prevented deterioration by oxidation and property changes, the strength of the bags which did not show sufficient oxygen absorption was lowered due to deterioration by oxidation after sintering. With the packing bag which used the self-reacting-type oxygen absorber, moldability was lowered due to property changes which were deemed to be caused by the movement of water.

The embodiment of the present invention as described above provides an oxygen-absorbing resin composition which can sufficiently cause oxygen absorption even in a low-water environment. Accordingly, the use of packing material which is made from this composition makes it possible to preserve substances such as dried foods, for example, powdery foods, in a low-oxygen environment with the certainty that the quality or properties of the preserved substance will not be lowered. Moreover, since there is no movement of water from the packing material to the preserved substance, it is possible, for example, to avoid the occurrence of deterioration such as solidification of the preserved substance. Furthermore, the resin composition of this embodiment of the invention is a novel oxygen-absorbing resin composition of the self-reacting type which does not require the coexistence of any water-holding substance.

What is claimed is:

1. An oxygen absorber packet capable of absorbing said oxygen in an environment of not more than 70% relative humidity and in the absence of a water-supplying component, having the oxygen-absorbing composition comprising:

a reduced metal and an accelerator, said accelerator comprising either a metallic iodide salt or a metallic bromide salt or a mixture thereof, wherein the composition is capable of absorbing said oxygen in an environment of not more than 70% relative humidity and in the absence of a water-supplying component, said oxygen-absorbing composition being included in a dry state and being in the form of particles and wrapped in a gas permeable wrapping material.

2. A preservation method, wherein the oxygen absorber packet according to claim 1 and an item to be preserved are placed into and sealed in a gas-impermeable container.

3. The preservation method according to claim 2, wherein the oxygen permeability of the gas-impermeable container is 0.05–100 cc/m$^2$, 24 hr. atm (25° C., 50% RH).

4. The preservation method according to claim 2, wherein the item to be preserved is a medical product or food having a water activity of 0.2–0.7.

5. The preservation method according to claim 2, wherein the gas-impermeable container has a relative humidity of 20–70% inside.

6. A packet for an item to be preserved, having a relative humidity of 20–70% inside, comprising:

a gas-impermeable packaging container; the packet according to claim 1 held in said gas-impermeable packaging container; and the item to be preserved in said packet having a water activity of 0.2–0.7.

7. The oxygen absorber packet according to claim 1, wherein said reduced metal is iron powder.

8. The oxygen absorber packet according to claim 1, wherein said metallic iodide salt or said metallic bromide salt is an alkali metallic salt.

9. The oxygen absorber packet according to claim 8, wherein said alkali metallic salt is a potassium salt or a sodium salt or a mixture thereof.

* * * * *